United States Patent [19]

Matsui

[11] Patent Number: 5,612,936
[45] Date of Patent: Mar. 18, 1997

[54] METHOD AND APPARATUS FOR DETECTING TRACKING ERROR SIGNAL FOR OPTICAL DISK USING PAIRS OF PHOTOSENSORS

[75] Inventor: Tsutomu Matsui, Tokyo, Japan

[73] Assignee: NEC Corporation, Japan

[21] Appl. No.: 503,821

[22] Filed: Jul. 18, 1995

[30] Foreign Application Priority Data

Jul. 20, 1994 [JP] Japan .................................... 6-168126

[51] Int. Cl.⁶ ................................................. G11B 7/095
[52] U.S. Cl. ........................................ 369/44.32; 369/54
[58] Field of Search ............................ 369/44.23, 44.32, 369/44.37, 44.41, 44.42, 54

[56] References Cited

U.S. PATENT DOCUMENTS 5,172,355  12/1992  Nagahara et al. .................... 369/44.32

FOREIGN PATENT DOCUMENTS 0075676  4/1983  European Pat. Off. .
0562158  9/1993  European Pat. Off. .

OTHER PUBLICATIONS

Patent Abstracts of Japan, vol. 17, No. 269, (P–1544), May 25, 1993, & JP5–6564.
"Push–pull tracking error detection using a pickup with polarizing hologram" by K. Kasazumi et al., Extended Abstracts of Autumn Meeting of Jpn. Soc. Appl. Phys., Sep. 1994.

Primary Examiner—W. R. Young
Attorney, Agent, or Firm—Ostrolenk, Faber, Gerb & Soffen, LLP

[57] ABSTRACT

According to a method and apparatus for detecting a tracking error signal for an optical disk of this invention, the tracking error signal is detected from a differential output of a pair of first photosensors arranged in areas in which a 0th-order component and ±1st-order components of a reflected beam incident on a track groove of a grooved optical disk are superposed. An offset signal of the tracking error signal is detected on the basis of outputs from a pair of second photosensors arranged between the first photosensors at a center of an area, of the 0th-order component, in which the 0th-order component is not superposed on the ±1st-order components, and the first and second photosensors are aligned in a tracking servo direction. The first and second photosensors are controlled to move on the basis of the detected offset signal.

10 Claims, 4 Drawing Sheets

METHOD AND APPARATUS FOR DETECTING TRACKING ERROR SIGNAL FOR OPTICAL DISK USING PAIRS OF PHOTOSENSORS

BACKGROUND OF THE INVENTION

The present invention relates to a method and apparatus for detecting a tracking error signal, capable of performing high-speed access to the inner and outer radii of an optical disk corresponding to a ROM disk, a writing once disk, or an erasable disk and, more particularly, to a method and apparatus for detecting a tracking error signal for a so-called separation type optical head in which an objective lens actuator portion which tracks variations in the axial direction (focusing direction) of the disk and the radial direction (tracking direction) of the disk is separated from an optical head main body.

In recent years, studies of an external storage apparatus having the high-speed accessibility of a magnetic disk used in a computer system and a large-capacity memory of an optical disk have rapidly advanced. An optical disk apparatus is expected as a next-generation disk apparatus because the optical disk apparatus has a high transfer rate, high-speed random access, a large-capacity memory, good preservation for a medium, and high durability effected by non-contact recording/reading for the medium.

In some optical disk apparatus, only an objective lens actuator is moved from the inner radius of a disk to the outer radius thereof, and the optical system of an optical head is fixed. This is to minimize the weight of a movable member and to increase a moving speed.

FIG. 3 shows a conventional separation type optical head. Referring to FIG. 3, a beam emitted from a laser 31 is collimated into a parallel beam by a collimator lens 32, and the parallel beam passes through a compound prism 36 obtained by integrating a wedge-shaped prism 33 and beam splitters 34 and 35, and a parallel beam emerges from a stationary optical system 37. The exit beam from the stationary optical system 37 is deflected 90° by a 45° mirror 39 incorporated in the lower portion of an objective lens actuator 38 moved from the inner radius of an optical disk (to be referred to as a disk hereinafter) 41 to the outer radius thereof, and reaches an objective lens 40.

The light beam focused by the objective lens 40 is reflected by the disk 41 and incident on the stationary optical system 37 in an order reverse to that of the above optical path, and a magneto-optical signal, a focusing error signal, and a tracking error signal are detected through the compound prism 36. More specifically, a light beam deflected by the beam splitter 35 of the compound prism 36 is detected through a polarization optical system (not shown). On the other hand, the light beam deflected 90° by the beam splitter 34 of the compound prism 36 propagates straight through a condenser lens 42 and a half mirror 43 to reach a 2-division photosensor 44. The light beam input to the 2-division photosensor 44 is photoelectrically converted by two elements 45 and 46 constituting the 2-division photosensor 44, and a differential amplifier 47 differentially detects two signals from the elements 45 and 46 to obtain a push-pull tracking error signal.

A focusing error signal is detected by, e.g., a knife-edge method, from the light beam deflected 90° by the half mirror 43. More specifically, one semicircular component of the circular light beam deflected by the half mirror 43 is cut, and the other semicircular component is input to a 2-division photosensor 49 arranged at the convergence point of the light beam. Two signals are output from the 2-division photosensor 49, and the two signals are differentially detected to obtain a focusing error signal.

In the separation type optical head in which the actuator is separated from the optical system main body, when the optical system is arranged at the outer radial portion of the disk 41, and the objective lens actuator 38 is moved to the inner radial portion of the disk 41, the distance between the disk 41 and the photosensor 44 for detecting a tracking error signal becomes maximum. At this time, when decentering of the disk 41, deformation of the disk, or inclination of the disk in a dynamic mode during rotation of the disk 41 occurs, the beam is moved to a portion shifted from the center of the 2-division photosensor 44 because the distance between the disk 41 and the 2-division photosensor 44 for detecting the tracking error signal is long. FIG. 4A shows this beam tracking operation for easy comprehension.

Referring to FIG. 4A, a designed optical axis is indicated by a solid line 50, and a beam reflected by the disk 41 is indicated by a broken line as a return optical axis 51. When the disk 41 is rotated, the disk 41 is mechanically deformed to be inclined by a dynamic resonance mode. Otherwise, when the disk 41 is arranged on a platter 52, the disk 41 is mechanically inclined. For this reason, the beam reflected by the disk 41 passes through the optical path of the return optical axis 51 indicated by the broken line extended from the disk 41. The reflected beam on the return optical axis 51 is transmitted through the beam splitter 35, and deflected 90° by the beam splitter 34, and focused by the condenser lens 42. A tracking error detection beam reaches a position which is separated from the center of the photosensor on the 2-division photosensor 44. A tracking error signal is obtained by differential detection performed by the 2-division photosensor 44.

FIG. 4B shows a tracking error signal 53 obtained when the disk 41 is not inclined, and FIG. 4C shows a tracking error signal 54 having an actual offset variation and generated by the inclination of the disk 41. Referring to FIGS. 4A and 4B, when a tracking servo operation is performed by the tracking error signal 54 having the offset variation, a tracking operation is performed while the beam drifts between tracks, and the tracking operation becomes unstable. In addition, the envelope of a reproduced signal loses uniformity, and the signal cannot be stably reproduced.

SUMMARY OF THE INVENTION

It is an object of the present invention to provide a method and apparatus for detecting a tracking error signal for an optical disk, which stabilizes a tracking operation for the optical head of the above separation type optical disk drive and assures the uniformity of the envelope of a reproduced signal.

It is another object of the present invention to provide a method and apparatus for detecting a tracking error signal for an optical disk, which can perform a digital recording/reproducing operation having a high C/N ratio and can obtain a low bit error rate.

In order to achieve the above objects, according to the present invention, there is provided a method of detecting a tracking error signal for an optical disk, comprising the steps of detecting the tracking error signal from a differential output of a pair of first photosensors arranged in areas in which a 0th-order component and ±1st-order components of a reflected beam incident on a track groove of a grooved optical disk are superposed, detecting an offset signal of the tracking error signal on the basis of outputs from a pair of second photosensors arranged between the first photosensors at a center of an area, of the 0th-order component, in which the 0th-order component is not superposed on the ±1st-order components, the first and second photosensors being aligned in a tracking servo direction, and controlling to move the first and second photosensors on the basis of the detected offset signal.

DESCRIPTION OF THE PREFERRED EMBODIMENT

The present invention will be described below with reference to the accompanying drawings.

Figure 1:
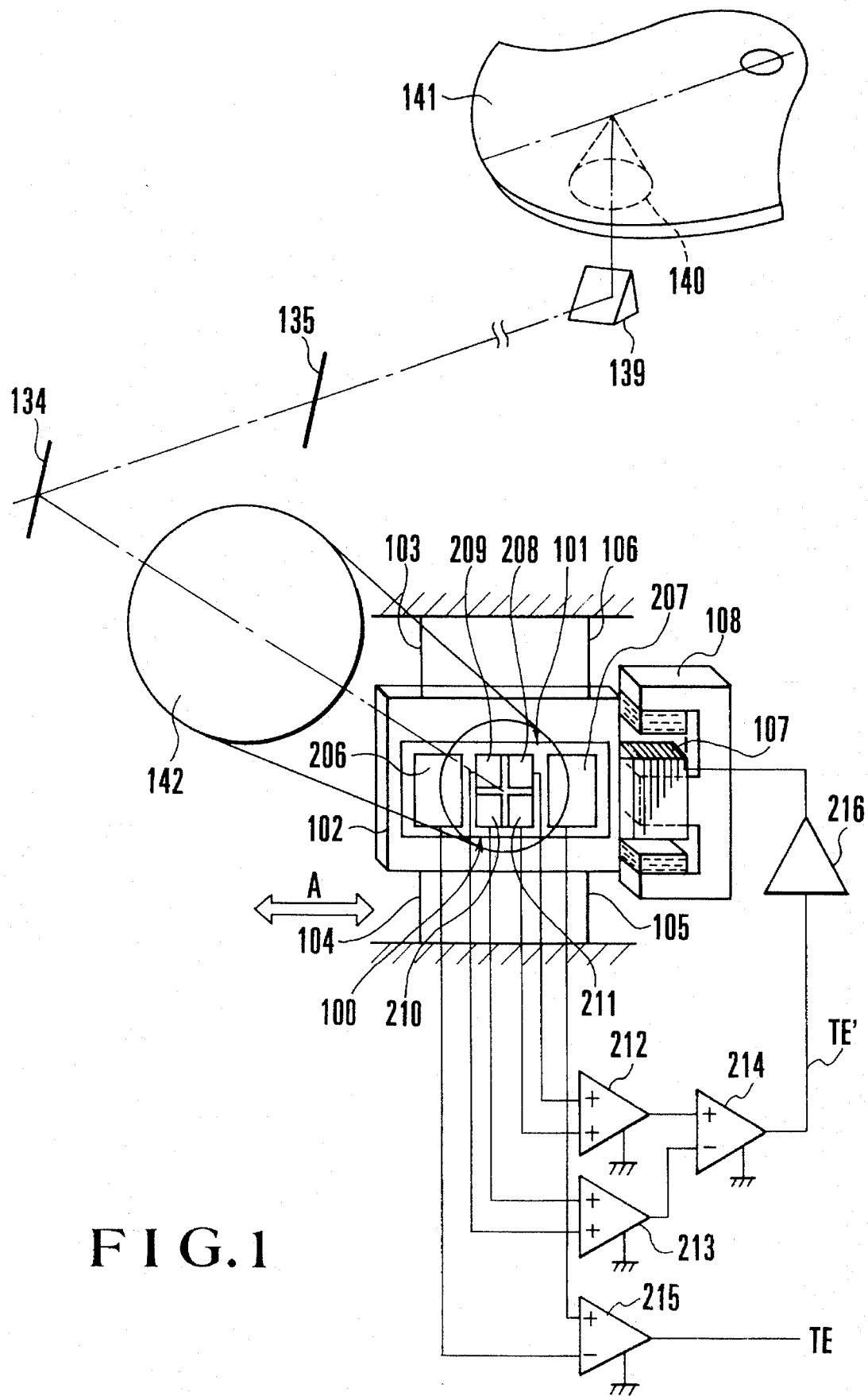
FIG. 1 is a view showing the arrangement of a separation type optical head to which an embodiment of the present invention is applied.
Figure 2:
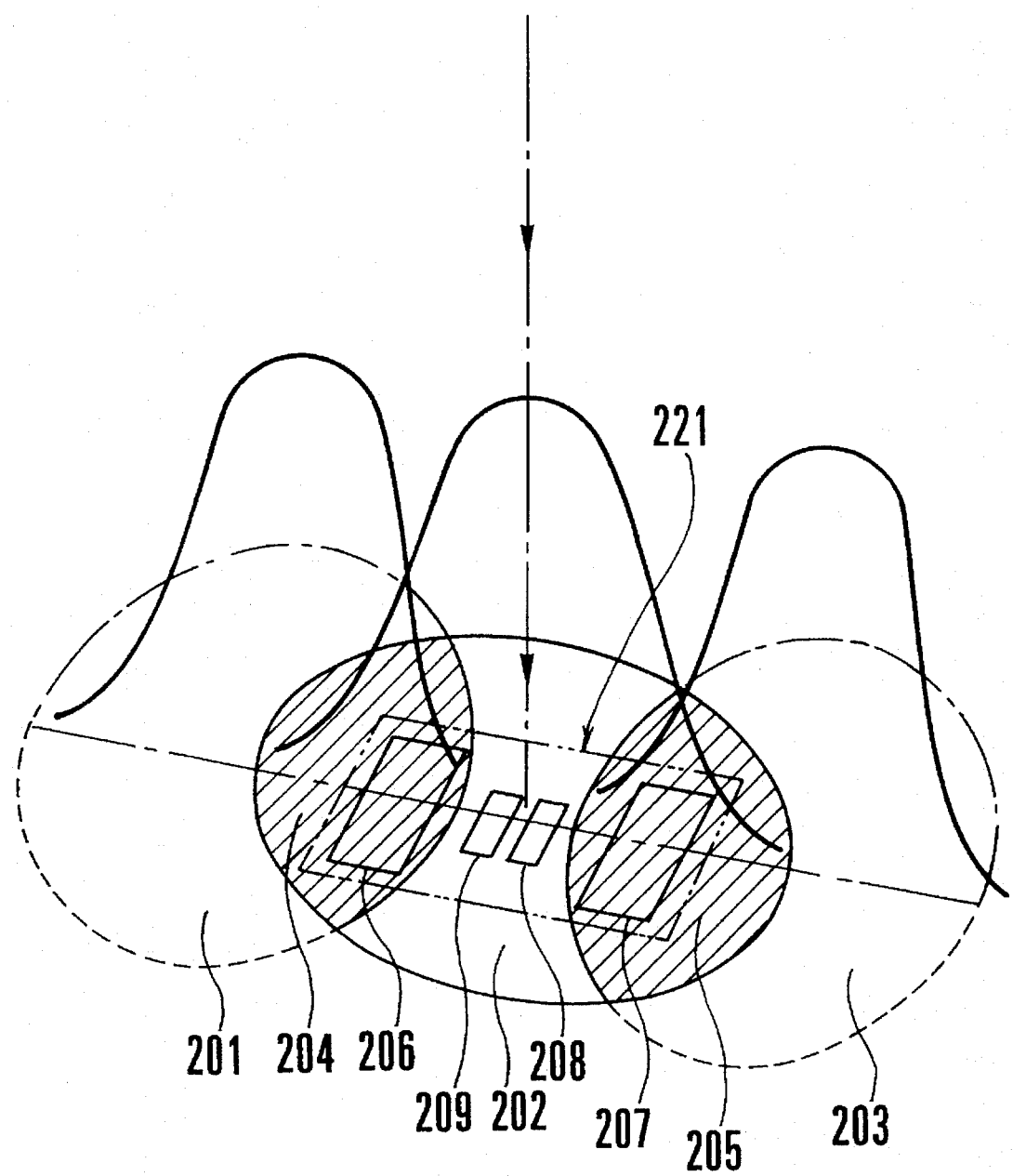
FIG. 2 is a perspective view for explaining the shape of a focused beam reaching a multi-division photosensor 101 in FIG. 1
Figure 3:
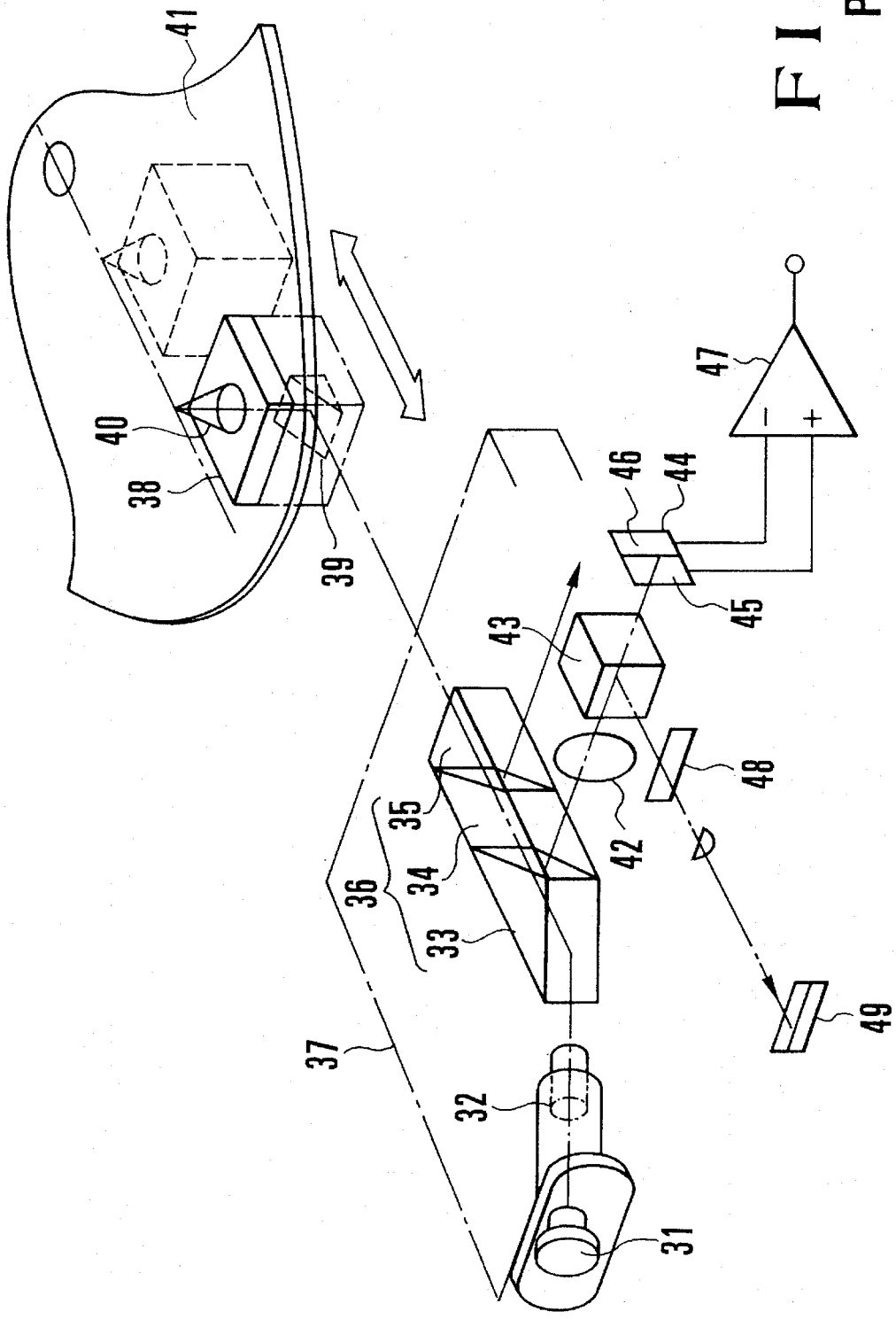
FIG. 3 is a view showing the arrangement of a conventional separation type optical head.
Figures 4A, 4B, 4C:
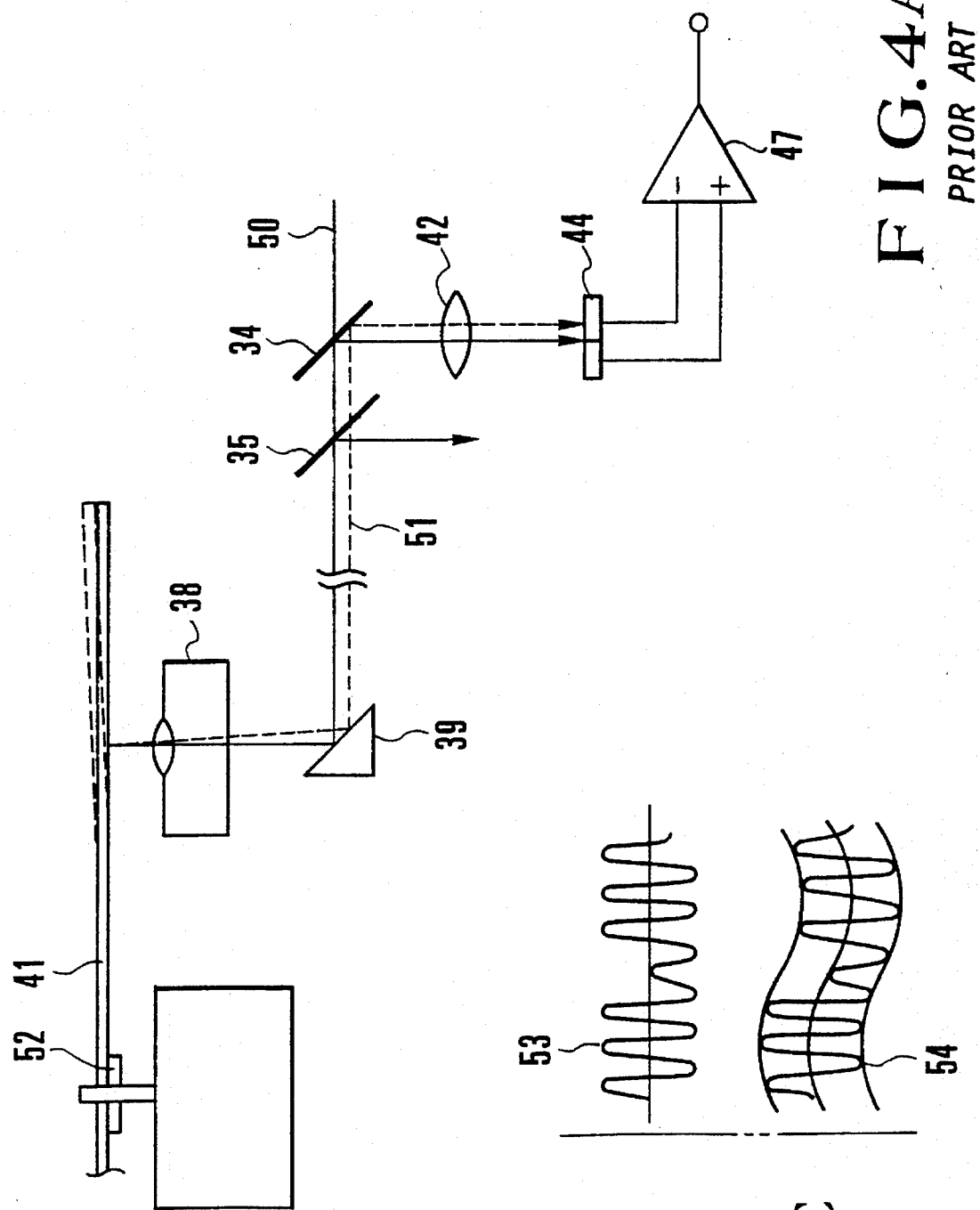
FIGS. 4A to 4C are a view and graphs for explaining tracking error signal detection performed by the separation type optical head in FIG. 3.

FIG. 1 shows the arrangement of a separation type optical head to which an embodiment of the present invention is applied, and FIG. 2 explains the shape of a focused beam to a photosensor in FIG. 1.

In a method and apparatus for detecting a tracking error signal according to the present invention, as shown in FIG. 1, a parallel beam emitted from an optical system (not shown) is reflected by an optical disk (to be referred to as a disk hereinafter) 141 and deflected 90° by a 45° mirror 139 through an objective lens 140. The deflected beam is deflected by a beam splitter 134 through a beam splitter 135 and focused by an optical lens 142. The focused beam propagates straight through a half mirror (not shown) to reach a multi-division photosensor 101. In addition, a magneto-optical signal causes a polarizing optical system (not shown) to detect the light beam deflected by the beam splitter 135.

The multi-division photosensor 101 constituted by six photosensor elements is supported in a photosensor holder 102 by a support spring system constituted by four parallel leaf springs 103, 104, 105, and 106 which are symbolized. The photosensor holder 102 is designed to cause a drive mechanism constituted by an photosensor drive coil 107 and a magnetic circuit 108 to perform moving/tracking control in a direction of an arrow A, i.e., a tracking servo direction.

The multi-division photosensor 101 comprises four photosensor elements 208 to 211 constituting a 6-division photosensor having a cross-shaped 4-division photosensor 100 arranged at the center of the multi-division photosensor 101, and two photosensor elements 206 and 207 arranged on both the sides of the 4-division photosensor 100 in the direction of the arrow A, i.e., on both the sides in the tracking servo direction. Analog outputs from the photosensor elements 208 and 211 of the 4-division photosensor 100 are added to each other by an arithmetic circuit 212, and analog outputs from the photosensors 209 and 210 of the 4-division photosensor 100 are added to each other by an arithmetic circuit 213. Outputs from the arithmetic circuits 212 and 213 are input to a differential amplifier 214. The differential amplifier 214 differentially detects the outputs from the arithmetic circuits 212 and 213, and supplies an offset signal TE' of a tracking error signal to the photosensor drive coil 107 through an amplifier 216. Outputs from the photosensor elements 206 and 207 arranged on both the sides of the 4-division photosensor 100 are differentially detected by a differential amplifier 215, and a push-pull tracking error signal TE is output to a tracking coil (not shown) of the objective lens 140.

When the outputs from the photosensor elements 208 to 211 are represented by A to D, and the outputs from the photosensor elements 206 and 207 are represented by E and F, the tracking error signal TE and offset signal TE' described above are expressed by equations (1) and (2):

$$TE = E - F \quad (1)$$

$$TE' = (A+D) - (B+C) \quad (2)$$

FIG. 2 explains the shape of a focused beam reaching the multi-division photosensor 101 in FIG. 1. Referring to FIG. 2, three Gaussian curves represent the light amounts of a −1st-order component 201, a 0th-order component 202, and a +1st-order component 203 which are ordered from the left, respectively. Areas 204 and 205 in which the 0th-order component 202 and the ±1st-order components 201 and 203 are superposed are represented by hatched portions. In the shape of the focused beam, the photosensor elements 206 and 207 on both the sides of the 4-division photosensor 100 are arranged in the superposed areas 204 and 205, respectively. The tracking error signal TE is detected on the basis of the outputs from the photosensor elements 206 and 207.

In order to detect an offset of the tracking error signal TE, the photosensor elements 208 and 209 of the 4-division photosensor 100 are aligned with the photosensor elements 206 and 207 on the central portion of the 0th-order component 202 where the ±1st-order components 201 and 203 are not superposed on the 0th-order component 202.

In the arrangement of the photosensor elements 206 to 209 shown in FIG. 2, the tracking error signal TE is expressed by equation (3) as in equation (1):

$$TE = E - F \quad (3)$$

If the outputs C and D from the photosensor elements 210 and 211 are neglected, the offset signal TE' can be obtained. For this reason, the outputs C and D are eliminated from the right-hand member of equation (2), and the following equation can be obtained:

$$TE' = A - B \quad (4)$$

The photosensor drive coil 107 shown in FIG. 1 is driven by the offset signal TE' obtained by equation (4), so that the photosensor holder 102 is controlled to move in the direction of the arrow A by a DC offset.

In the above embodiment, as the multi-division photosensor 101, a 6-division photosensor including the 4-division photosensor 100 and constituted by six photosensor elements 206 to 211 is used. This is because a large number of 6-division photosensor photosensors are commercially available at low cost. For this reason, the cross-shaped 4-division photosensor 100 is used in place of the central photosensor elements 208 and 209. Theoretically, in order to extract the offset signal TE', a 2-division photosensor divided in the tracking servo direction may be used in place of the cross-shaped 4-division photosensor 100. In this case, the multi-division photosensor 101 for extracting the tracking error signal TE and the offset signal TE', as indicated by a chain double-dashed line in FIG. 2, comprises a 4-division photosensor 221 constituted by the inline photosensor elements 206 to 209 which are divided in the tracking servo direction. When the 4-division photosensor 221 is used, two outputs from the photosensor elements 208 and 209 are directly input to the differential amplifier 214 and differentially amplified, thereby extracting the offset signal TE'.

As has been described above, according to the present invention, a pair of photosensors for detecting an offset signal of a tracking error signal are arranged on the central portion of a 0th-order component between a pair of photosensors, arranged in areas in which the 0th-order component is superposed on ±1st-order components, for detecting the tracking error, and the positions of the pair of photosensors for detecting the tracking error signal are controlled by the obtained offset signal, thereby correcting the DC offset of the tracking error signal. For this reason, in a separation type optical head in which the distance between a disk and a photosensor for detecting a tracking error signal is long, a stable tracking operation can be performed.

In addition, an effect of additionally improving the temperature characteristics of the optical head can be obtained. More specifically, when the linear expansion coefficients of a prism, an optical head base, and the like are different from each other due to a change in temperature, a beam returning from the disk may be offset from the center of the photosensors for detecting the tracking error signal. Even in this case, since a servo operation is performed on the basis of the offset variable signal of the tracking error signal, the servo operation can be performed without offsetting the tracking error signal, and a stable tracking operation can be performed.

What is claimed is:

1. A method of detecting a tracking error signal for an optical disk, comprising the steps of:

detecting the tracking error signal from a differential output of a pair of first photosensors arranged in areas in which a 0th-order component and ±1st-order components of a reflected beam incident on a track groove of a grooved optical disk are superposed;

detecting an offset signal of the tracking error signal on the basis of outputs from a pair of second photosensors arranged between said first photosensors at a center of an area of the 0th-order component, in which the 0th-order component is not superposed on the ±1st-order components, said first and second photosensors being aligned in a tracking servo direction; and controlling movement of the first and second photosensors on the basis of the detected offset signal;

wherein said first and second photosensors include a 4-division photosensor having photosensor elements which are divided and aligned in the tracking servo direction, the tracking error signal is detected from outputs from a pair of outer photosensor elements of said 4-division photosensor, and the offset signal of the tracking error signal is detected from outputs from a pair of inner photosensor elements of said 4-division photosensor.

2. A method according to claim 1, wherein said second photosensors are constituted by a 2-division photosensor having two photosensor elements divided in the tracking servo direction.

3. A method according to claim 1, wherein said first and second photosensors are integrally held by a photosensor holder, and the step of controlling movement of said first and second photosensors comprises the step of moving and controlling said photosensor holder.

4. An apparatus for detecting a tracking error signal for an optical disk, comprising:

a pair of first photosensors arranged in areas in which a 0-order beam and the ±1st-order components of a reflected beam incident on a track groove of a grooved optical disk are superposed;

first detection means for detecting the tracking error signal from a differential output of said first photosensors;

a pair of second photosensors arranged between said first photosensors at a center of an area of the 0th-order component, in which the 0th-order component and the ±1st-order component are not superposed, said first and second photosensors being arranged to be aligned in a tracking servo direction;

second detection means for detecting an offset signal of the tracking error signal on the basis of outputs from said second photosensors; and movement control means for controlling movement of said first and second photosensors on the basis of the offset signal from said second detection means to perform movement control for said first and second photosensors;

wherein said first and second photosensors include a 4-division photosensor having photosensor elements which are divided and aligned in the tracking servo direction, the tracking error signal is detected from outputs from a pair of outer photosensor elements of said 4-division photosensor, and the offset signal of the tracking error signal is detected from outputs from a pair of inner photosensor elements of said 4-division photosensor.

5. An apparatus according to claim 4, wherein said second detection means is constituted by a differential amplifier for differentially amplifying two outputs from said second photosensors to output a push-pull offset signal.

6. An apparatus according to claim 4, wherein said second photosensors are constituted by a 2-division photosensor having two photosensor elements divided in the tracking servo direction.

7. An apparatus according to claim 4, further comprising a photosensor holder, which can be moved in the tracking servo direction, for integrally holding said first and second photosensors, and wherein said movement control means performs movement control for said photosensor holder on the basis of the offset signal from said second detection means.

8. An apparatus according to claim 7, wherein said movement control means is constituted by a drive coil driven by the offset signal from said second detection means and a magnetic circuit for said drive coil, so that said drive coil and said magnetic circuit electromagnetically perform movement control for said photosensor holder.

9. An apparatus according to claim 4, wherein said second photosensors are constituted by a 4-division photosensor having four photosensor elements divided in a cross-shaped form in such a manner that one pair of two pairs of photosensor elements arranged in two rows in the tracking servo direction are arranged at a center of the area of the 0th-order component.

10. An apparatus for detecting a tracking error signal for an optical disk, comprising:

a pair of first photosensors arranged in areas in which a 0-order beam and the ±1st-order components of a reflected beam incident on a track groove of a grooved optical disk are superposed;

first detector to detect the tracking error signal from a differential output of said first photosensors;

a pair of second photosensors arranged between said first photosensors at a center of an area of the 0th-order component, in which the 0th-order component and the ±1st-order component are not superposed, said first and second photosensors being arranged to be aligned in a tracking servo direction;

second detector to detect an offset signal of the tracking error signal on the basis of outputs from said second photosensors; and movement controller to control movement of said first and second photosensors on the basis of the offset signal from said second detector to perform movement control for said first and second photosensors;

wherein said first and second photosensors include a 4-division photosensor having photosensor elements which are divided and aligned in the tracking servo direction, the tracking error signal is detected from outputs from a pair of outer photosensor elements of said 4-division photosensor, and the offset signal of the tracking error signal is detected from outputs from a pair of inner photosensor elements of said 4-division photosensor.

\* \* \* \* \*